United States Patent
Albers et al.

(10) Patent No.: US 6,560,605 B2
(45) Date of Patent: *May 6, 2003

(54) PRESENTATION OF LINK INFORMATION AS AN AID TO HYPERMEDIA NAVIGATION

(75) Inventors: Michael C. Albers, San Franciso, CA (US); Eric D. Bergman, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/934,057

(22) Filed: Aug. 21, 2001

(65) Prior Publication Data

US 2002/0049741 A1 Apr. 25, 2002

Related U.S. Application Data (63) Continuation of application No. 09/704,024, filed on Nov. 1, 2000, which is a continuation of application No. 08/656,559, filed on May 31, 1996, now Pat. No. 6,223,188.

(60) Provisional application No. 60/019,052, filed on May 6, 1996, and provisional application No. 60/015,249, filed on Apr. 10, 1996.

(51) Int. Cl.⁷ .......................... G06F 13/38; G06F 17/30
(52) U.S. Cl. ......................... 707/10; 707/501; 707/513
(58) Field of Search .................. 707/1–5, 10, 500, 707/501.1, 513

(56) References Cited

U.S. PATENT DOCUMENTS

| 5,467,288 A | * | 11/1995 | Fasciano et al. ............ 345/302 |
| 5,572,643 A | * | 11/1996 | Judson ....................... 395/155 |
| 5,623,589 A | * | 4/1997 | Needham et al. ............ 345/302 |
| 5,701,451 A | * | 12/1997 | Rogers et al. ............... 395/600 |
| 5,737,619 A | * | 4/1998 | Judson ........................ 395/761 |
| 5,748,186 A | * | 5/1998 | Raman ........................ 345/302 |
| 5,778,181 A | * | 7/1998 | Hidary et al. ........... 395/200.48 |
| 5,790,793 A | * | 8/1998 | Higley ........................ 707/513 |
| 5,805,815 A | * | 9/1998 | Hill ............................ 707/501 |
| 5,878,233 A | * | 3/1999 | Schloss ....................... 709/225 |
| 5,923,846 A | * | 7/1999 | Gage et al. ............. 395/200.43 |
| 5,978,847 A | * | 11/1999 | Kisor et al. ................. 709/227 |

OTHER PUBLICATIONS

Mark R. Brown Special Edition USING Netscape 2 Second Edition, 1995.*

Graham I. S. "The HTML Sourcebook" Mar. 14, 1995 Published by John Wiley & Sons, Inc. pp. 85–95 and 181–230.*

(List continued on next page.)

*Primary Examiner*—Jack Choules
(74) *Attorney, Agent, or Firm*—Campbell Stephenson Ascolese, LLP; Samuel G. Campbell, III (57) ABSTRACT

A system for presenting hypermedia link information. A computer-implemented method for presenting hypermedia link information is described which relates to the user the characteristics of a data file pointed to by the hypermedia link. The computer system waits for an event to occur. This event is the user or system selecting one or more hypermedia links. The hypermedia link in this scenario points to a data file about which information is to be gathered. The computer system then requests information about the data file. In one embodiment, a cue is generated to communicate information about said data file to a user. This information may be conveyed to the user by auditory or visual means, such as a pop-up information box on the user's display. A powerful and convenient system for browsing hypermedia information is thus provided.

40 Claims, 10 Drawing Sheets

OTHER PUBLICATIONS

Albers, Michael C., Bergman, Eric, (May, 1995). "The Audible Web: Auditory Enhancements For Mosaic" (pp. 318–319). CHI '95 Mosaic of Creativity, Denver, CO.

Albers, Michael C., Bergman, Eric. "The Auditory Web: Auditory Enhancements For WWW Browers." CHI '95 Mosaic of Creativity, Denver, CO.

Albers, Michael C., Bergman, Eric, "The Audible Web." CHI '95 Mosaic of Creativity, Denver, CO.

Alberts, M. C. "The Varese System, Hybrid Auditory Interfaces, and Satellite–Ground Control: Using Auditory Icons and Sonification in a Complex, Supervisory Control System." Proceedings of the International Conference on Auditory Display '94. Santa Fe, N.M.

Ballas, J. A. (1994). "Delivery of Information through Sound." In G. Kramer (Ed.), Auditory Display: Sonification, Audification, and Auditory Interfaces (pp. 79–94). Reading, MA: Addison–Wesley Publishing Company.

Blattner, M. M., A. L. Papp III, & E. P. Glitnert (1994). "Sonic Enhancement of Two–Dimensional Graphic Displays," In G. Kramer (Ed.), Auditory Display: Sonification, Audiciation, and Auditory Interfaces. Reading, MA: Addison–Wesley Publishing Company.

Gaver, W. (1993). "Synthesizing Auditory Icons." Proceedings of INTERCHI '93 (pp. 228–235). Amersterdam: ACM.

Groff, Jean–Francois & Descombes Jacques, "Untangling the Web." Info Design, Geneva, CH (no date).

Kramer, G. (1994). "An Introduction to Auditory Display." In G. Kramer (Ed.), Auditory Display: Sonification, Audiciation, and Auditory Interfaces (pp. 1–77). Reading, MA: Addison–Wesley Publishing Company.

Meschkat, S. "Active Articles in Interactive Journals." ART+COM, Berlin, DE (no date).

Mynatt, E. D. "Designing With Auditory Icons." Proceedings of the International Conference on Auditory Display '94. Santa Fe, NM.

Scaletti, C. & Craig, A. (1991). "Using Sound to Extract Meaning form Complex Data." Proceedings of the SPIE, Conference 1459, Extracting Meaning from Complex Data: Processing Display, Interaction II. San Jose: SPIE.

Staten, James, "Newton Beat: Web Client in Development." (Nov. 14, 1994). MacWeek, vol. 8, No. 45, p. 29.

Umstaetter, A., "WWW'94 Demonstration submission: The Ping Project." Hochschule der Kinste, Berlin, DE (no date).

* cited by examiner

PRESENTATION OF LINK INFORMATION AS AN AID TO HYPERMEDIA NAVIGATION

CROSS-REFERENCE TO RELATED APPLICATIONS

This application is a continuation of patent application Ser. No. 09/704,024, filed Nov. 1, 2000 and entitled "Presentation of Link Information As An Aid To Hypermedia Navigation," having Michael C. Albers and Eric D. Bergman as inventors, which is a continuation of patent application Ser. No. 08/656,559 (now U.S. Pat. No. 6,223,188), filed May 31, 1996 and entitled "Presentation of Link Information As An Aid To Hypermedia Navigation," having Michael C. Albers and Eric D. Bergman as inventors, which claims priority to Provisional Application Ser. No. 60/015,249, filed Apr. 10, 1996 expired and Ser. No. 60/019,052, filed May 6, 1996 expired. The foregoing applications are assigned to Sun Microsystems, Inc., the assignee of the present invention, and are hereby incorporated by reference, in their entirety and for all purposes.

BACKGROUND OF THE INVENTION

The present invention relates to a system for conveying to a user the characteristics of data files displayed as hypermedia links and to the presentation of content information about such hypermedia links via audible feedback.

Hypermedia is a paradigm for representing information as documents interconnected by "links" (references to other documents or data files). Files so referenced can (and often do) reference other files in the same manner. Using the hypermedia paradigm, large numbers of data files can thus form highly interconnected documents and file systems.

An example of hypermedia's popularity is its use on the Internet. The Internet is an enormous distributed collection of data. Use of the Internet has increased dramatically with the advent of the world-wide web (WWW). The WWW uses hypermedia concepts to allow easier access to this mass of information. In the WWW paradigm, links in a WWW document are represented by Universal Resource Locators (URLs). These URLs give the WWW address of the system (webserver) on which the information (data file) is stored. Other information in the URL includes the data file's name and location on the webserver. Data files referenced in such systems may contain text, digitized audio, digitized video, or other information, or may themselves be executable programs.

Hypermedia and the tools designed to view such information have existed for several years. Unfortunately, many hypermedia tools exhibit known computer-human interface problems. Such tools often give users little or no feedback about the characteristics of the data files referenced by the links which point to the data file's location, the time to obtain that information or the results of ongoing processes.

In many hypermedia systems (e.g., Sun Microsystem's™ WWW browser HotJava™), the manner in which a data file is represented often allows the user to view only the data file's name and location (its URL). Information regarding the data file's size, its file type, the length of time required to download the data file and other information is often unavailable to the user, save for actually downloading the file. Such information is only available if it is included in the hypermedia page on which the data file's URL is displayed. This places the onus of providing such information on the party maintaining the WWW site. Moreover, dynamic information such as the download time cannot be hard-coded. This is because such information is not deterministic and depends upon a variety of variables such as the current load on the webserver, the current load on the network, and the network distance between the client and webserver. Thus, many WWW sites do not and, in some respects, cannot provide such information. These URL's may represent data files residing on webservers far removed from the system on which the browser resides. This is true not only for the WWW, but for any widely-distributed network-based hypermedia browsing environment. Unfortunately, a webserver's operator has no transparent method of indicating such information (especially dynamic information such as download time) to a user operating a hypermedia browser.

While visual cues may be used to relay this information to the user, the highly visual task of searching for the desired links in a hypermedia display reduces the visual bandwidth available for acquiring information regarding each link's characteristics. Visual enhancements which provide more information may compound the problem by forcing additional cognitive loads on the user. In addition, there are situations when graphical information display may be inappropriate or invasive. For example, visual cues notifying a user about progress, completion or errors tend to distract the user from the (primarily visual) task which they are currently performing.

Accordingly, it is desirable and important to efficiently provide information on hypermedia links without forcing the user to actually download the information represented by those links. Further, it is desirable to provide such information and information regarding the hypermedia browser's operations in a manner which minimizes interference with the user's operation of the computer system and even further engages the user in the operation of the hypermedia browser.

SUMMARY OF THE INVENTION

By virtue of the present invention, a system is provided for conveying to a user the characteristics of data files displayed as hypermedia links and for the presentation of content information about such hypermedia links via audible feedback.

In one embodiment, a computer-implemented method for presenting hypermedia link information is provided which communicates to the user the characteristics of a data file to which the hypermedia link points. The computer system waits for one or more hypermedia links to be selected. The hypermedia link in this scenario points to a data file about which information is to be gathered. The computer system then requests information about the data file. In one aspect of this embodiment, a cue is generated to communicate information about said data file to a user. This cue may be an auditory cue (e.g., a piano note with a pitch related to the data file's relative size) or a visual cue (e.g., a pop-up information box on the user's display).

In another embodiment, a computer-implemented method for presenting hypermedia link information is provided in which selected links in a hypermedia document (e.g., all the links on the page currently displayed) are examined. The characteristics of each link are then returned to the user. The process begins by having the computer retrieve a hypermedia page. The computer system then retrieves information about each file (or a pre-selected set of files) represented by a hypermedia link on the hypermedia page. This is done by generating an information request, sending the information request to a computer system on which the data file resides, receiving the information, and processing the information. The information received is then communicated to the user.

A further understanding of the nature and advantages of the inventions herein may be realized by reference to the remaining portions of the specification and the attached drawings.

DESCRIPTION OF SPECIFIC EMBODIMENTS

Figure 1:
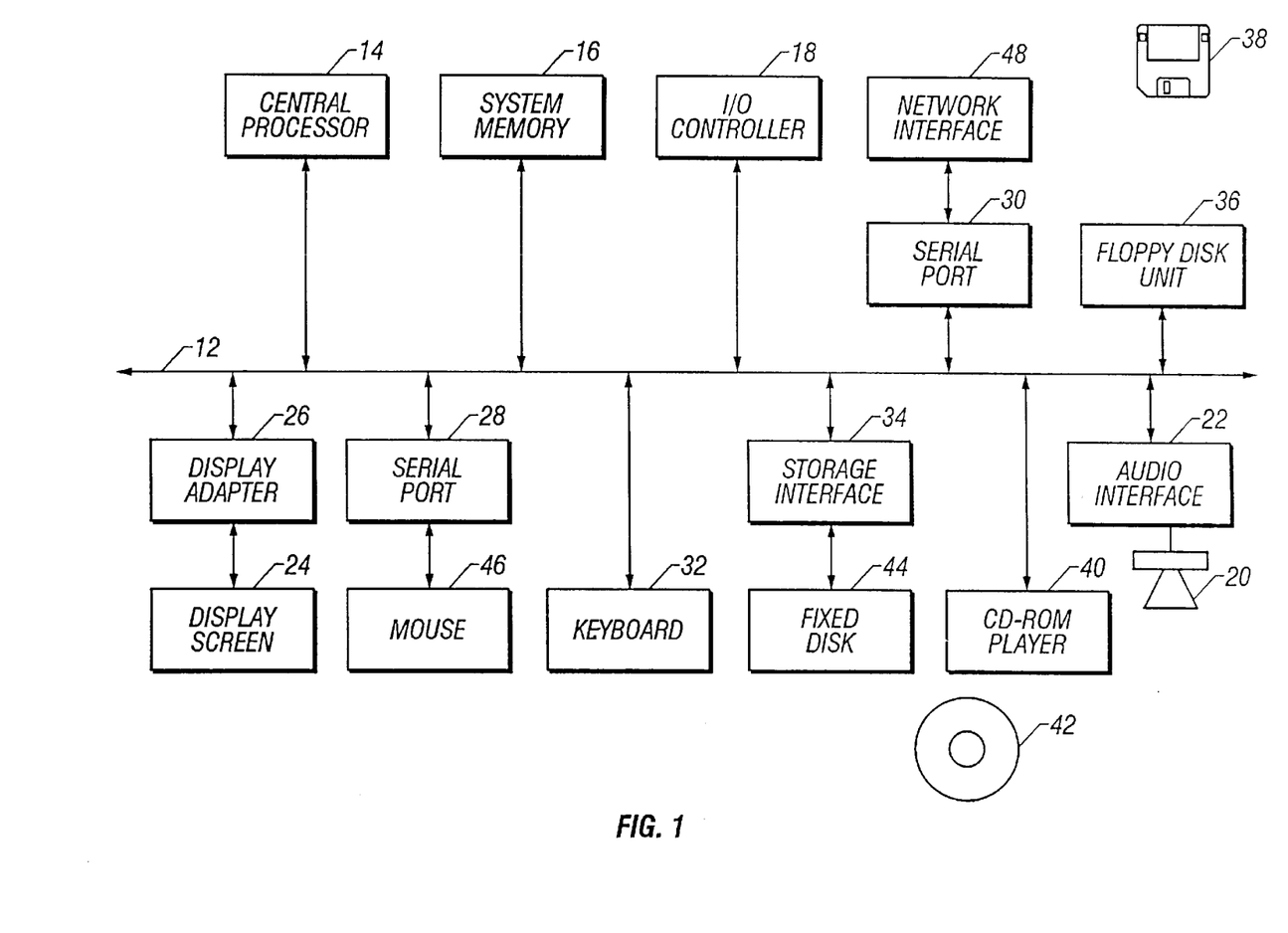
FIG. 1 depicts a block diagram of a host computer system suitable for implementing the present invention.

FIG. 1 depicts a block diagram of a host computer system 10 suitable for implementing the present invention. Host computer system 10 includes a bus 12 which interconnects major subsystems such as a central processor 14, a system memory 16 (typically RAM), an input/output controller 18, an external audio device such as a speaker system 20 via an audio output interface 22, an external device such-as a display screen 24 via display adapter 26, serial ports 28 and 30, a keyboard 32, a storage interface 34, a floppy disk drive 36 operative to receive a floppy disk 38, and a CD-ROM player 40 operative to receive a CD-ROM 42. Storage interface 34 may connect to a fixed disk drive 44. Fixed disk drive 44 may be a part of host computer system 10 or may be separate and accessed through other interface systems. Many other devices can be connected such as a mouse 46 connected via serial port 28 and a network interface 48 connected via serial port 30. Network interface 48 may provide a direct connection to a remote server via a telephone link or to the Internet via a POP (point of presence). Many other devices or subsystems (not shown) may be connected in a similar manner.

Also, it is not necessary for all of the devices shown in FIG. 1 to be present to practice the present invention. The devices and subsystems may be interconnected in different ways from that shown in FIG. 1. The operation of a computer system such as that shown in FIG. 1 is readily known in the art and is not discussed in detail in this application. Code to implement the present invention may be operably disposed or stored in computer-readable storage media such as one or more of system memory 16, fixed disk 44, CD-ROM 42, or floppy disk 38.

Figure 2:
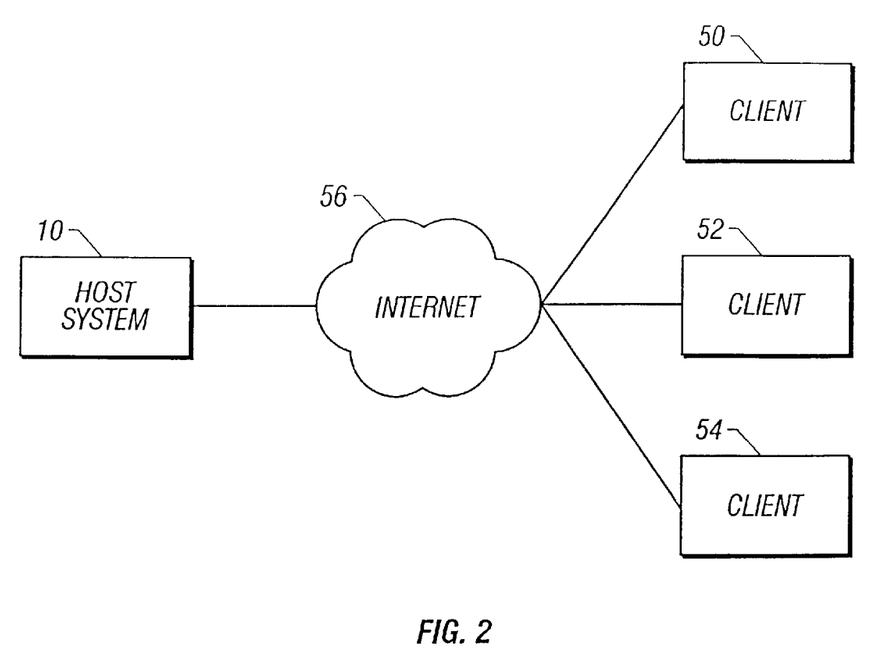
FIG. 2 depicts the interconnection of the host computer system to remote clients.

FIG. 2 depicts the interconnection of host computer system 10 to client systems 50, 52, and 54. FIG. 2 depicts the Internet 56 interconnecting client systems 50, 52, and 54. Modem 48 or some other network interface provides the connection from host computer system 10 to the Internet 56. Protocols for exchanging data via the Internet are well known to those skilled in the art. Although FIG. 2 depicts the use of the Internet for exchanging data, the present invention is not limited to the Internet or any network-based environment.

Figure 3:
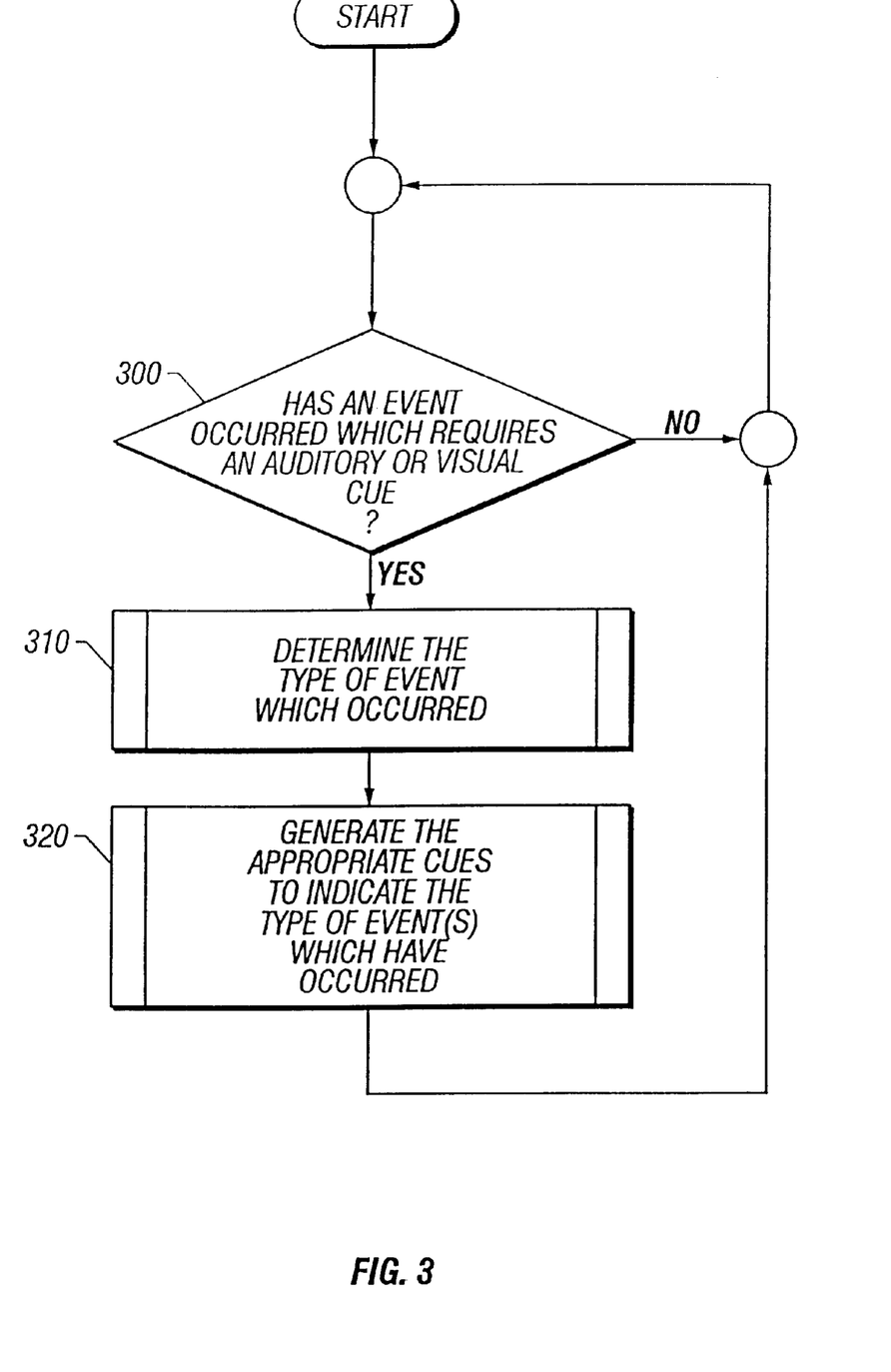
FIG. 3 is a flowchart describing the steps of generating an auditory or visual cue based on an event according to one embodiment of the present invention.

In one embodiment of the present invention, an auditory or visual cue is generated to indicate that a user or system action has occurred, or that the system has responded in some way. This is illustrated by the flowchart shown in FIG. 3. At step 300, the system waits for an action or event to occur in the hypermedia browser system that requires the generation of some type of cue. If no action has occurred that requires a cue, the system simply continues to wait. If the user has taken an action or a system event has occurred (e.g., a file transfer has completed) that requires a cue, the system determines the type of action taken or the type of event that occurred in step 310. At step 320, the system generates an appropriate auditory or visual cue (or cues) to indicate the type of action or event that has occurred. A visual or audible indication of the action or event may be provided to the user to indicate to the user that the action or event has occurred. However, the use of auditory cues has applicability in situations such as a windowed operating environment where the program has been iconified.

Communicating such information to the user by generating auditory cues provides several other advantages. Auditory cues are particularly useful for enhancing hypermedia tools because such tools exhibit known computer-human interface problems: users get little or no feedback about the size and content of information referenced by links, time to obtain that information, and the results of ongoing processes. By using audible rather than visual enhancements, more information may be provided to the user while shifting the additional cognitive load to a different modality.

Auditory cues are preferable when they complement visual interfaces by increasing a user's sense of engagement, enhancing monitoring of background processes, and reinforcing visually represented information. In addition, there are situations when graphical information display may be inappropriate or invasive. For ongoing processes such as file transfer, auditory cues can notify users about progress, completion, and errors without distracting them from the visual task currently being performed. Such a system is described in the WWW documents presented as Section B in U.S. Pat. No. 6,223,186 entitled "Presentation of Link Information As An Aid To Hypermedia Navigation," as previously included by reference herein. The URLs of these documents exist at http://www.isye.gatech.edu under the pathnames:

1) /chmsr/Mike_Albers/papers/WWW/WWW_AW.html
2) /chmsr/Mike_Albers/projects/AW/AudibleWeb.html
3) /chmsr/Mike_Albers/papers/CHI95/CHI_AW_sp.html (These URLs were valid as of May 31, 1996.) However, while auditory cues may provide certain benefits, visual cues may also be used to present information gathered by the method of the present invention from sites storing hypermedia information and data files.

In one configuration of this embodiment, host computer system 10 has access to a hypermedia document stored locally. For example, this document may be stored on fixed disk drive 44 (if the drive is local) and accessed via storage interface 34. The document may also reside on floppy disk 38, CD-ROM 42 or other computer readable media.

In another configuration of this embodiment, the hypermedia document is stored on a remote computer system. In FIG. 2, for example, remote computer systems storing such documents are represented by clients 50, 52 and 54. Host computer system 10 is able to display hypermedia information (using display screen 24, for example) from several such clients. This is the case for WWW applications, where a hypertext transfer protocol (HTTP) server (webserver) operates on host computer system 10 and the hypermedia files reside on other (remote) computer systems. These files are typically in hypertext markup language (HTML) format, which is commonly readable by most commercially available WWW browsers. An explanation of HTML format for encoding hypermedia documents on the WWW is found in Morris, *HTML for Fun and Profit,* (SunSoft Press 1995), the contents of which are herein expressly incorporated by reference for all purposes.

A hypermedia document typically includes many pages. Often, each such document is stored in a separate file. A given hypermedia document will have links which point to various data files, which often will exist on one or more remote WWW servers. Client systems 50, 52, and 54 are configured to operate as webservers. A hypermedia browser running on host computer system 10 can access client systems 50, 52, and 54 as WWW sites over the Internet 18.

Figure 4:
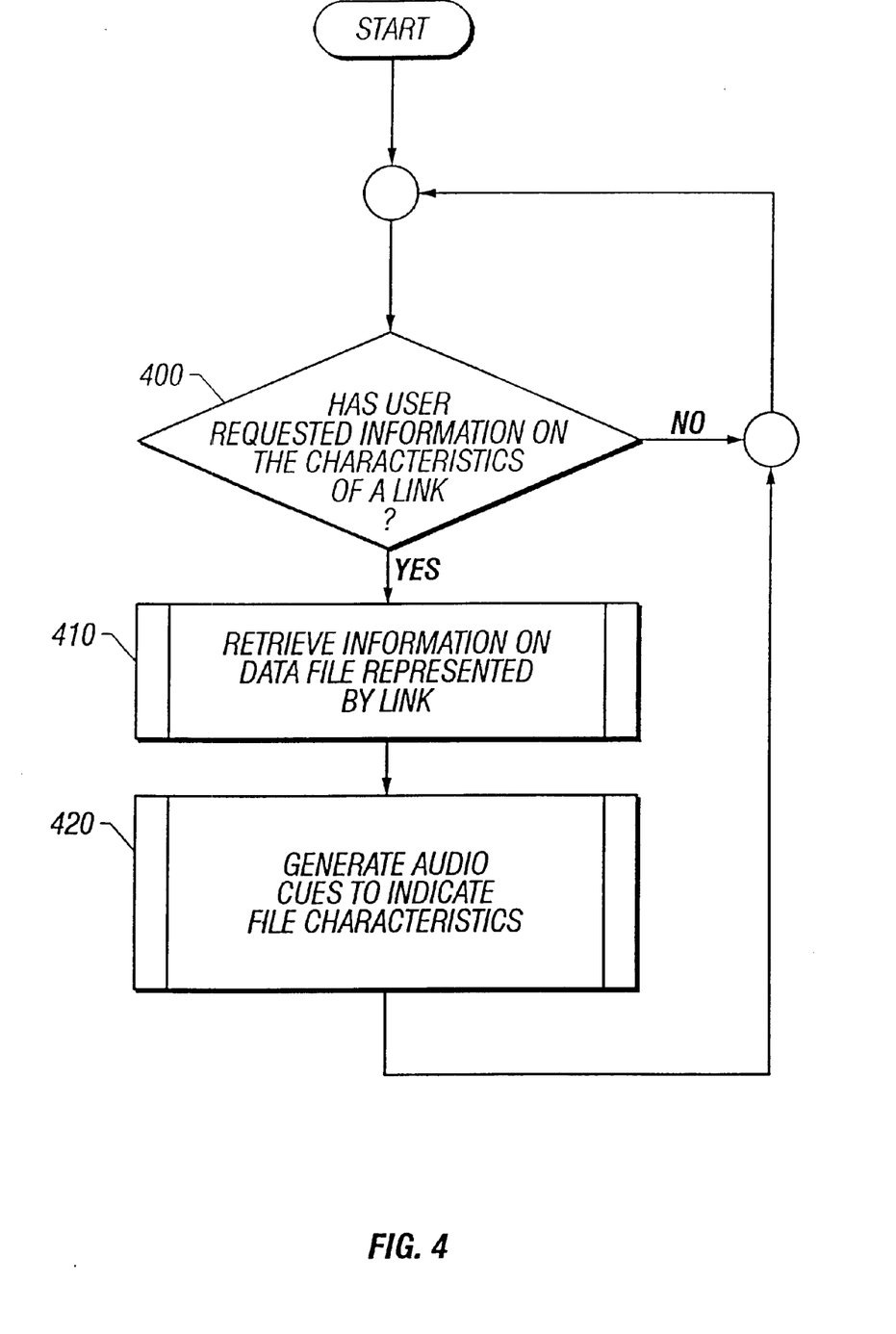
FIG. 4 is a flowchart describing the steps of generating an auditory cue based on information about a hypermedia link according to one embodiment of the present invention.

An example of this approach is illustrated in FIG. 4, which shows the steps taken in providing information about hypermedia links represented by WWW universal resource locators (URLs). FIG. 4 is a flowchart describing steps of indicating to the user the characteristics of a data file pointed to by a URL. At step 400, the browser waits for the user to request information on the characteristics of a URL. Once the user has made this request, the system requests information about the data file represented by the link at step 410. At step 420, the system receives the information and generates a cue (audible or visual) to indicate to the user the characteristics of the data file.

Figure 5:
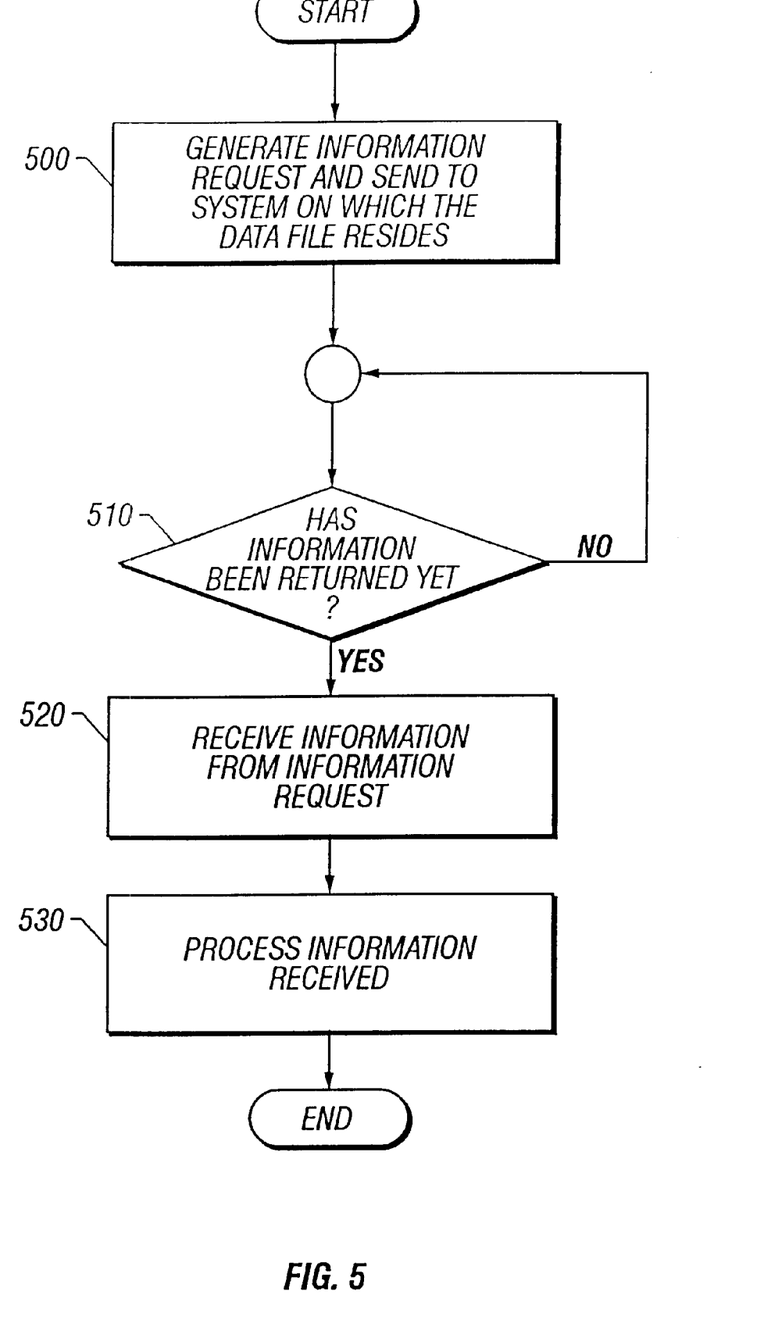
FIG. 5 is a flowchart describing the steps of retrieving information about a hypermedia link according to one embodiment of the present invention.

The system requests information on the data file represented by the link in the manner shown in FIG. 5. At step 500, the system generates an information request and sends this information request to the system on which the data file resides. In the case of hypermedia documents on the WWW, the system retrieves this information by performing an httpd HEAD request (httpd is the program which handles hypermedia access requests when using the WWW). This request is similar to the request usually made to retrieve the hypermedia document to which the link points. However, instead of retrieving the entire hypermedia document, only basic information stored in the hypermedia document's header is returned. This saves the user the time and resources that actually downloading the hypermedia file would entail, thus reducing network traffic.

In an organization, the more WWW users employing the method of the present invention, the greater will be the reduction in network usage. This is because, often, only the basic hypermedia document information will need to be transferred, rather than the entire hypermedia document. Furthermore, the HEAD request is a standard feature of HTTP. HTTP-compliant webservers thus require no modification to support information retrieval by the method of the present invention. At step 510, the system waits for the information regarding the data file to be returned. Once the information is returned, the system receives this information from its information request at step 520. At step 530, the system processes the information received. This processing generally takes the form of parsing the information to collect the particular information which has been requested.

Information about the file may be presented as an auditory cue (i.e., one or more sounds which conveys the information to the user). When one or more links are selected, the method of the present invention can provide an auditory cue which conveys information regarding the corresponding file (or files). The file's type may be represented by sounds such as:

the sound of a typewriter, representing a text file;
the sound of a camera shutter, representing a graphics file;
the sound of a running 8 mm projector, representing a video file; and
the sound of a tune on a piano, representing an audio file.

An approximation of the file's relative size may be represented by a piano note. The note's pitch can then be varied according to the file's size, with higher notes representing successively smaller files. This is a relative measurement, in that a pitch indicating a given file size will be generated with regard to the file's type. Thus, for example, for two files of different types (e.g., a video file and a text file) with notes having the same pitch, the files will differ in actual size (the video file will be larger than the corresponding text file).

Figure 6:
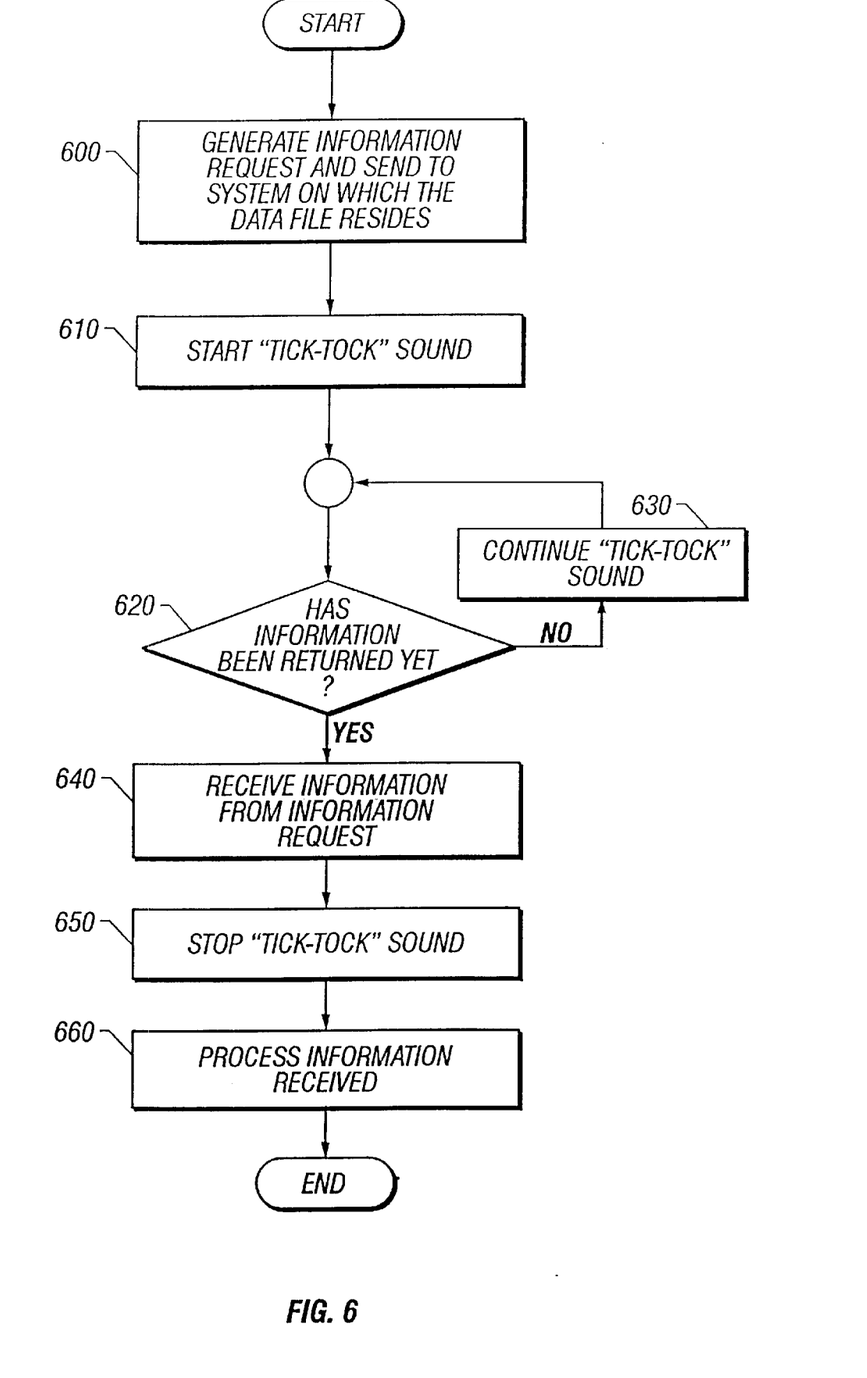
FIG. 6 is a flowchart describing the steps of retrieving information about a hypermedia link according to a further embodiment of the present invention.

FIG. 6 illustrates a method which also provides audible feedback to the user indicating the length of time required to retrieve the data file represented by the URL. At step 600, an information request is generated and sent to the system on which the data file of interest resides. This is the data file which is represented by the URL which appears on the hypermedia page currently being viewed. At step 610, a "tick-tock" sound is begun, which will continue until the file has been successfully retrieved or an error condition occurs. At step 620, the system waits for the information to be returned. At step 630, if no information has yet been returned, the system continues to produce the "tick-tock" sound, indicating to the user an approximation of the relative time which will be required to retrieve the data file. Once the information on the data file has been returned, the system receives the information requested at step 640. At step 650, the "tick-tock" sound ceases, indicating that the transfer of data file information is complete.

The duration of the "tick-tock" sound presents a relative measure of the time required for information to travel between the user's system and the system on which the data file resides, a longer the duration signifying an equally longer download time. Thus, the user can only make a relative estimate of download time from the auditory cue's duration. For example, if a cue lasts 10 seconds while retrieving file information from one location and 5 seconds while retrieving identical file information from a second location, the user can expect that the download time for the first system's file will be about twice that for the second system's. Moreover, this measurement reflects not only static parameters such as the distance between the user's system and the remote system and the data file's size, but also reflects dynamic characteristics such as the current level of network traffic. This dynamic indication of the time required to retrieve the data file allows the user to decide if the time required is acceptable, or whether it would be best to wait (e.g., until there is less network traffic). At step 660, the information received is again processed. During this processing, the information received is parsed into its various components.

Figure 7:
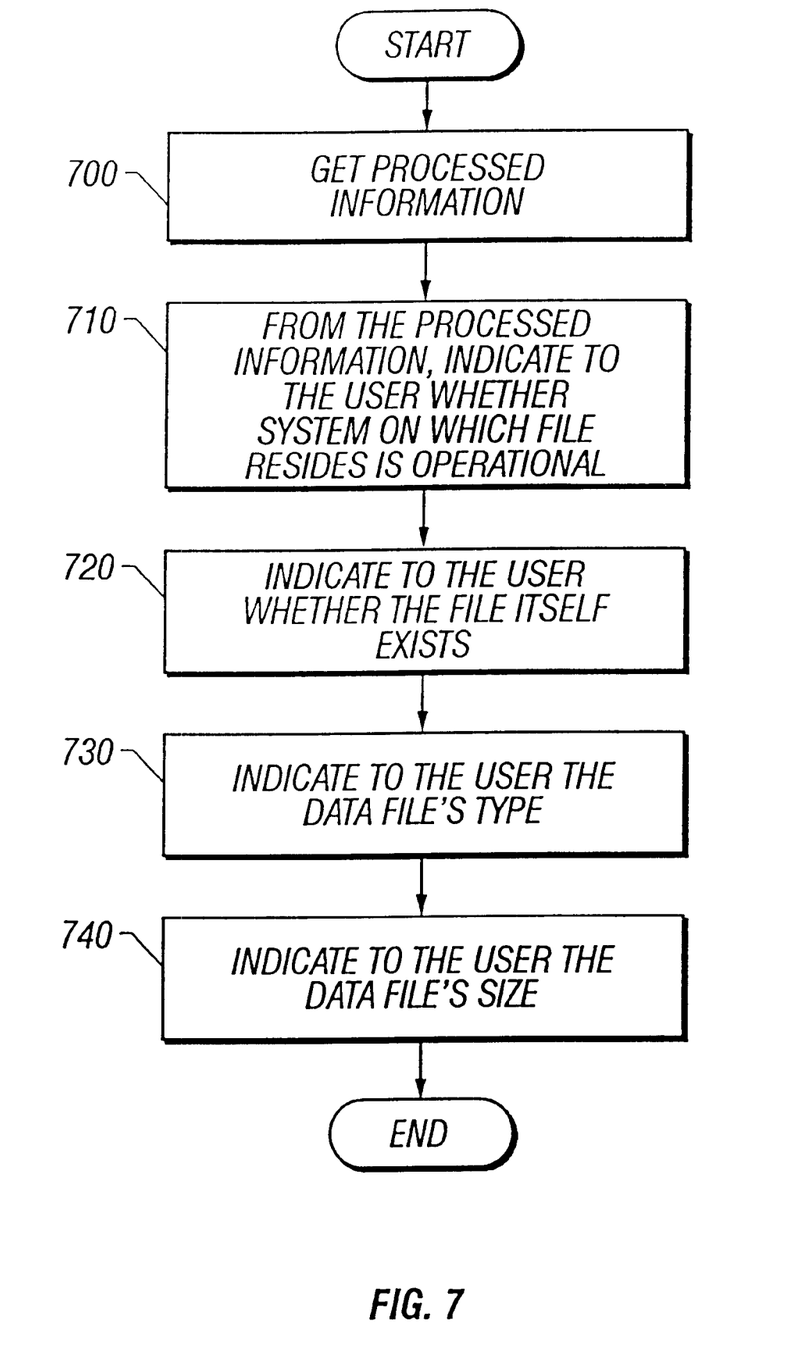
FIG. 7 is a flowchart describing the steps of processing information about a hypermedia link according to one embodiment of the present invention.

This processing is illustrated in FIG. 7. At step 700, the information to be processed is retrieved from the system. From the processed information the system indicates to the user whether the system on which the data file resides is operational at step 710. At step 720, the system indicates to the user whether the file about which information was requested exists on the remote system. Also indicated to the user are the data file's type at step 730 and the data file's size at step 740. This and similar information may be provided to the user in the form of auditory cues, but may also be provided by employing visual cues. For example, visual cues might be in the form of a pop-up window which would present information such as the condition of network traffic between the user's site and the webserver on which the data file resides. Changes in color, graphical indications and other methods might also be employed.

Figure 8:
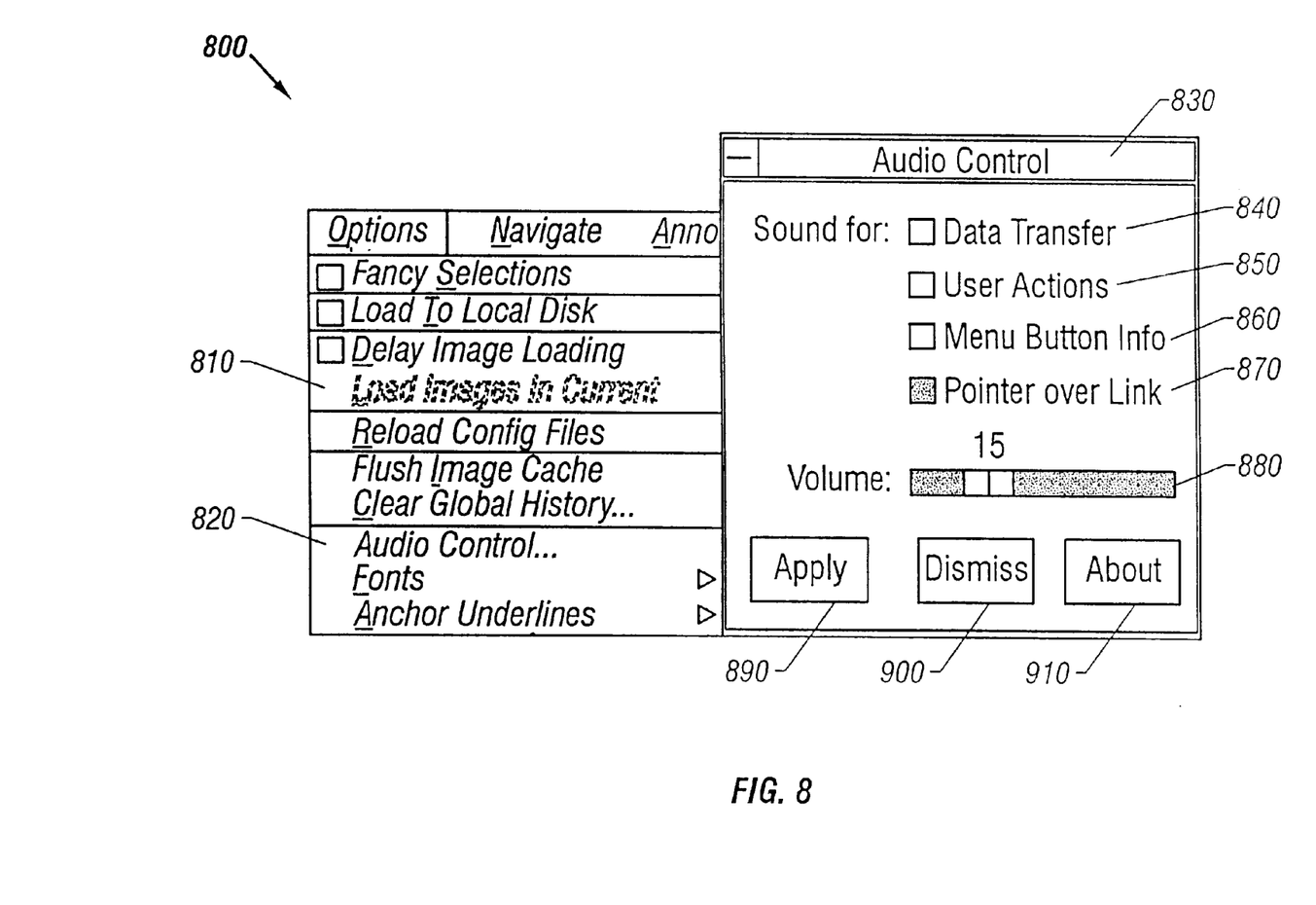
FIG. 8 depicts a menu system for configuring audible feedback according to one embodiment of the present invention.

FIG. 8 illustrates the menus which are used to control the auditory cues used in the preferred embodiment of the present invention. The user selects options 800 from a menu on a WWW browser. This brings up the options menu 18. The user selects an audio control 820 to bring up an audio control menu 830. The user may then make several selections to control the feedback of information via auditory cues.

A data transfer selection 840 controls auditory cues generated during the transfer of data. When this option is "on," auditory cues are played after selection of a link to another data file. Background sounds are played that give an indication of the progress of the data transfer.

A user actions selection 850 controls auditory cue generation relating to user actions. When this option is "on," auditory cues are generated when various actions are taken by the user. For example, buttons clicks and menu selections may cause sounds to be made when user actions selection 850 is selected.

A menu button information selection 860 allows the user to control whether information is gathered about a specific link. When this option is "on," users may request info about a URL (e.g., a link) by using the "menu button" (the right mouse button, for example). When the cursor is positioned over a link and the menu button depressed, information regarding the URL's relative network distance from the user is given (using the previously mentioned auditory cue), along with the type of data file pointed to by the URL, the relative size of the data file and other information.

A pointer over link selection 870, controls audio generation when the cursor is positioned over a link. When this option is 'on' and the user positions the cursor over a link, auditory cues are generated which communicate file information regarding the data file represented by the link. For example, if the link's URL specifies a text file, then the auditory cue representing a text file is generated. These actions are not based on whether the data file actually exists, but on the information returned by the remote system. Menu button information selection 860 checks for the existence of the data file at the end of a link, which pointer over link selection 870 does not. A volume control 880 controls the volume of the auditory cues which are generated.

Figure 9:
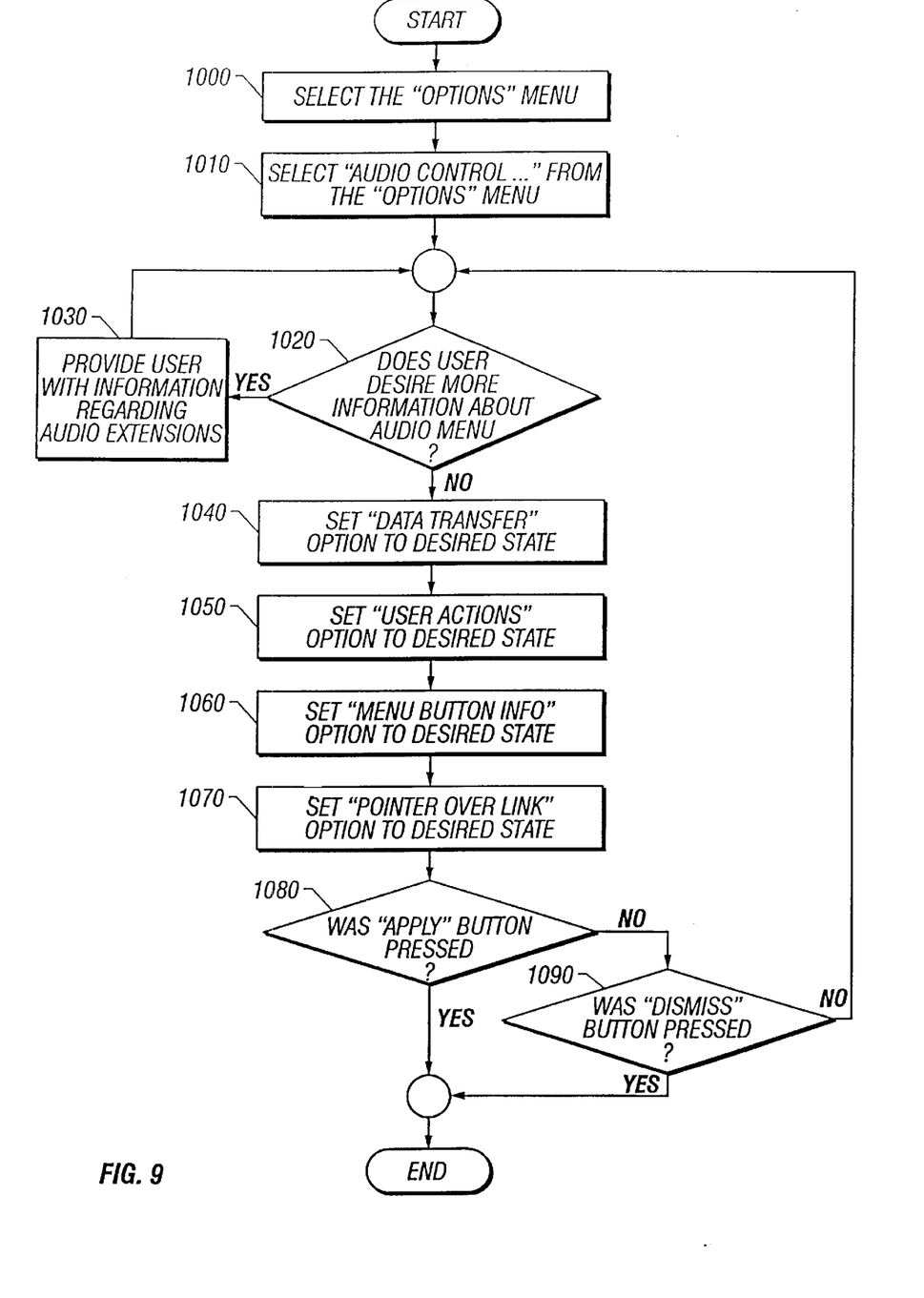
FIG. 9 is a flowchart describing the steps of configuring audible feedback according to one embodiment of the present invention.

In FIG. 9, a process is shown for the use of the audio control menu illustrated in FIG. 8. The process begins at step 1000 by the user selecting the "Options" selection from a main menu (not shown). At step 1010, the user selects "Audio Control . . . " from the options menu. At this point (step 1020), the user decides whether more information is desired about the audio menu. If more information is desired about the audio menu, the user is provided with information regarding audio extensions at step 1030. The user indicates that such information is desired by clicking on the "About" button. If no information is desired about the audio menu, the user may set several different parameters to configure the system to provide auditory cues.

At step 1040, the user may set the "Data Transfer" option to the state desired by the user. At step 1050, the user may set the "User Actions" option to the desired state. At step 1060, the user may set the "Menu Button Info" option to the desired state. At step 1070, the user may set the "Pointer Over Link" option to the desired state. The selections made by the user are then either implemented or the menu is dismissed without making the indicated changes in configuration (if any).

At step 1080, the system determines whether the "Apply" button was pressed by the user. If the "Apply" button was clicked on by the user, the changes indicated by the user on the menu are implemented. If the "Apply" button was not clicked on by the user, the system determines whether the user clicked on the "Dismiss" button. If either the "Apply" button was pressed or the "Dismiss" button was pressed, the audio control menu is dismissed. If the dismiss button was pressed, the changes indicated by the user on the audio control menu are not implemented. If neither button was pressed, the process continues at step 1020. This process continues to loop until the user indicates that the selections made are or are not to be applied, and that the menu is to be dismissed.

Figure 10:
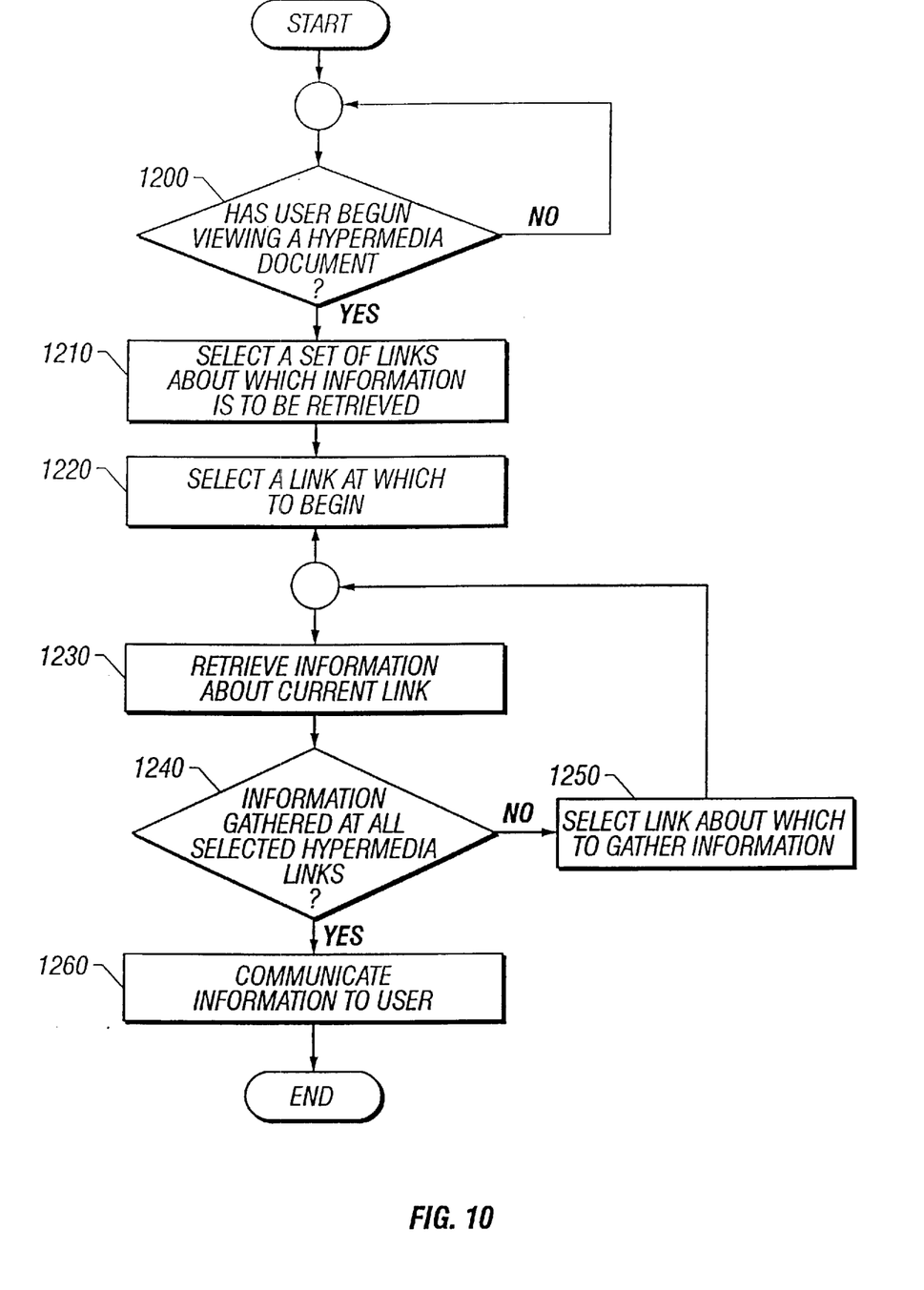
FIG. 10 is a flowchart describing the steps of generating an auditory cue based on information about all the hypermedia links in a hypermedia document according to one embodiment of the present invention.

FIG. 10 illustrates another embodiment of the present invention. In this embodiment, hypermedia links in a preselected portion of a hypermedia document (e.g., the hypermedia document being viewed) are examined. Information regarding these links is then presented to the user. For example, information may be gathered as to the links in the currently-displayed portion of the hypermedia document. This process begins at step 1200, which waits for a user to begin viewing the hypermedia document about which information is to be gathered. Once the user begins viewing such a document, the system selects a set of links in that hypermedia document. For example, the selection process may be controlled by user selection or predefined parameters, or the system may simply select all links currently displayed.

At step 1220, the system selects the first link to be examined. At step 1230, the system retrieves information such as relative download time, file type and file size of the selected link. At step 1240, the system determines whether information has been gathered about all the hypermedia links which were selected. If hypermedia links remain which have not been examined, the system selects the next link about which information is to be gathered at step 1250. At step 1260, if all selected links have been examined, the information gathered for each link in step 1230 is communicated to the user. This communication may take several forms, among them visual representations, auditory cues or a mixture thereof.

In the foregoing specification, the invention has been described with reference to specific exemplary embodiments thereof. It will, however, be evident that various modifications and changes may be made thereunto without departing from the broader spirit and scope of the invention as set forth in the appended claims.

Furthermore, the flowcharts described herein are illustrative of merely the broad logical flow of steps to achieve a method of the present invention and that steps may be added to, or taken away from the flowchart without departing from the scope of the invention. Further, the order of execution of steps in the flowcharts may be changed without departing from the scope of the invention. Additional considerations in implementing the method described by the flowchart may dictate changes in the selection and order of steps.

In general, the flowcharts in this specification include one or more steps performed by software routines executing in a computer system. The routines may be implemented by any means as is known in the art. For example, any number of computer programming languages, such as Java, "C", Pascal, FORTRAN, assembly language, etc., may be used. Further, various programming approaches such as procedural, object oriented or artificial intelligence techniques may be employed.

Many such changes or modifications will be readily apparent to one of ordinary skill in the art. For example, although the described embodiments refer to operation in the context of a network, the present invention will also find application when hypermedia documents are stored and viewed on the same system. Even when implemented in the network context, the present invention is not limited to the WWW, or to HTML documents. The specification and drawings are, accordingly, to be regarded in an illustrative rather than a restrictive sense, the invention being limited only by the provided claims and their full scope of equivalents.

What is claimed is:

1. A computer-implemented method for presenting hypermedia link information comprising:
    waiting for a hypermedia link to be indicated by an indication operation, wherein said hypermedia link references a data file that resides on a first computer system, said indication operation does not cause data in said data file to be downloaded from said first computer system to a second computer system; and
    upon said indication operation being performed, requesting information about said data file.

2. The method of claim 1, wherein
    said second computer system performs said computer-implemented method, and
    said information includes at least one of a file size and a download time.

3. The method of claim 2, wherein said indication operation comprises positioning a cursor over a displayed representation of said hypermedia link.

4. The method of claim 3, wherein said indication operation further comprises receiving input from a user which indicates said hypermedia link is to be indicated.

5. The method of claim 2, wherein said indication operation comprises automatically selecting said hypermedia link.

6. The method of claim 2, further comprising generating an auditory cue to communicate said information about said data file to a user.

7. The method of claim 6, wherein said generating comprises generating a first sound to indicate to said user whether a system on which said information resides is operational and whether said information exists on said system.

8. The method of claim 6, wherein said generating comprises generating a second sound to indicate to said user said information's type and quantity.

9. The method of claim 2, further comprising generating a visual cue to communicate said information about said data file to a user.

10. The method of claim 2, wherein said requesting comprises:
    generating an information request to request said information;
    sending said information request to said first computer system;
    waiting for said information to be returned;
    receiving said information; and
    processing said information.

11. The method of claim 10, wherein said generating comprises properly forming a hypertext transfer protocol HEAD request.

12. The method of claim 11, wherein said sending comprises transmitting said hypertext transfer protocol HEAD request to said first computer system.

13. The method of claim 10, wherein said processing comprises:
    determining if said first computer system is functional;
    determining if said data file exists; and
    parsing said information to recover characteristics of said data file.

14. The method of claim 13, wherein said characteristics comprise a size in bytes and a type of said data file.

15. The method of claim 2, wherein said requesting comprises:
    generating an information request to request said information;
    sending said information request to said first computer system;
    generating an audible indication that said information request has been made;
    waiting for said information to be returned while continuing to generate said audible indication;
    receiving said information;
    ceasing to generate said audible indication upon receiving said information; and
    processing said information.

16. The computer-implemented method of claim 1, further comprising:
    a selection operation, said selection operation causing said data in said data file to be downloaded from said first computer system to said second computer system.

17. A computer-implemented method for configuring a presentation of hypermedia link information comprising:
    requesting an explanation of information regarding said computer-implemented method using a first menu, if said explanation is desired;
    indicating, using said first menu, that information about a potential transfer of data is desired, wherein said information and said data are stored on a first computer system;
    indicating, using said first menu, that feedback to said user is to be generated upon said user taking one of a plurality of actions;
    indicating, using said first menu, that information about a hypermedia link indicated by said user is to be provided to said user, wherein said indication by said user does not cause said data to be downloaded from said first computer system to a second computer system, said second computer system performing said computer-implemented method; and
    indicating, using said first menu, that said information about a hypermedia link indicated automatically is to be provided to said user automatically.

18. The method of claim 17, wherein said exiting comprises:
    determining if said user selected a first exit selection from said first menu, and if said user selected a first exit selection,
    configuring said presentation of hypermedia link information to conform to said indications, and
    exiting said first menu.

19. The computer-implemented method of claim 16, further comprising:
a selection operation, said selection operation causing said data file to be downloaded from said first computer system to said second computer system.

20. A computer-implemented method for presenting hypermedia link information comprising:
retrieving a hypermedia page;
retrieving information about a data file represented by a hypermedia link on said hypermedia page in response to an indication operation, wherein said data file resides on a first computer system, said indication operation does not cause data in said data file to be downloaded from said first computer system to a second computer system and said second computer system performs said computer-implemented method; and
presenting said information.

21. The method of claim 20, wherein said first retrieving comprises:
generating an information request to request said information;
sending said information request to said first computer system;
waiting for said information to be returned;
receiving said information; and
processing said information.

22. The method of claim 21, wherein said generating step comprises properly forming a hypertext transfer protocol HEAD request.

23. The method of claim 22, wherein said sending step comprises transmitting said hypertext transfer protocol HEAD request to said computer system on which said data file resides.

24. The method of claim 21, wherein said processing comprises:
determining whether said first computer system is functional;
determining whether said data file exists; and
parsing said information to recover characteristics of said data file.

25. The method of claim 24, wherein said characteristics comprise a size in bytes and a type of said data file.

26. The computer-implemented method of claim 20, further comprising:
a selection operation, said selection operation causing said data file to be downloaded from said first computer system to said second computer system.

27. A first computer system comprising:
a network interface configured to transmit a request for data representing a selected page of a hypermedia document, said data stored as a data file on a second computer system coupled to said network interface, and return said data; and
a processor, coupled to said network interface and configured to:
wait for a hypermedia link to be indicated by an indication operation, wherein said hypermedia link points to said data file and said indication operation does not cause said data to be downloaded from said second computer system to said first computer system;
request information about said data file upon said indication operation, said information including at least one of a file size and a download time; and
present said information by generating a cue.

28. The first computer system of claim 27, wherein said hypermedia document is in hypertext markup language format.

29. The first computer system of claim 27, wherein said processing system is configured to request information about said data file by virtue of being further configured to:
generate an information request to request said information;
send said information request to said second computer system;
wait for said information to be returned;
receive said information; and
process said information.

30. The first computer system of claim 29, wherein said processing system is configured to generate said information request by virtue of being further configured to properly form a hypertext transfer protocol HEAD request.

31. The first computer system of claim 29, wherein said processing system is configured to send said information request to said second computer system by virtue of being further configured to transmit said hypertext transfer protocol HEAD request to said second computer system.

32. The first computer system of claim 29, wherein said processing system is configured to process said information by virtue of being further configured to:
determine whether said second computer system is functional;
determine whether said data file exists; and
parse said information to recover characteristics of said data file.

33. The first computer system of claim 27, said processor further configured to:
receive a selection operation, said selection operation causing said data file to be downloaded from said second computer system to said first computer system.

34. A computer program product for presenting hypermedia information, said product comprising:
code that retrieves a selected hypermedia document;
code that waits for a hypermedia link within said selected hypermedia document to be indicated by an indication operation, wherein said hypermedia link points to a data file that resides on a first computer system, said indication operation does not cause data in said data file to be downloaded from said first computer system to a second computer system and said second computer system executes codes comprising said computer program product;
code that requests information about said data file upon said indication operation, said information including at least one of a file size and a download time;
code that presents said information by generating a cue; and
a computer-readable medium that stores the codes.

35. The computer program product of claim 34, wherein said hypermedia document is in hypertext markup language format.

36. The computer program product of claim 34, wherein said code that requests information about said data file further comprises:
code that generates an information request to request said information;
code that sends said information request to said first computer system;

code that waits for said information to be returned;

code that receives said information; and code that processes said information.

37. The computer program product of claim 36, wherein said code that generates said information request further comprises code that properly forms a hypertext transfer protocol HEAD request.

38. The computer program product of claim 36, wherein said code that sends said information request to said first computer system further comprises code that transmits said hypertext transfer protocol HEAD request to said first computer system.

39. The computer program product of claim 36, wherein said code that processes said information further comprises:

code that determines whether said first computer system is functional;

code that determines whether said data file exists; and code that parses said information to recover characteristics of said data file.

40. The computer program product of claim 34, further comprising:

code that receives a selection operation, said selection operation causing said data file to be downloaded from said first computer system to said second computer system.

* * * * *

UNITED STATES PATENT AND TRADEMARK OFFICE
CERTIFICATE OF CORRECTION

PATENT NO.     : 6,560,605 B2
DATED          : May 6, 2003
INVENTOR(S)    : Michael C. Albers and Eric D. Bergman It is certified that error appears in the above-identified patent and that said Letters Patent is hereby corrected as shown below:

Column 11,
Line 1, please delete "16" and insert -- 17 --.

Signed and Sealed this

Twenty-fifth Day of November, 2003

JAMES E. ROGAN
*Director of the United States Patent and Trademark Office*